3,681,238
METHOD FOR STABILIZING PRODUCER WELL WATER

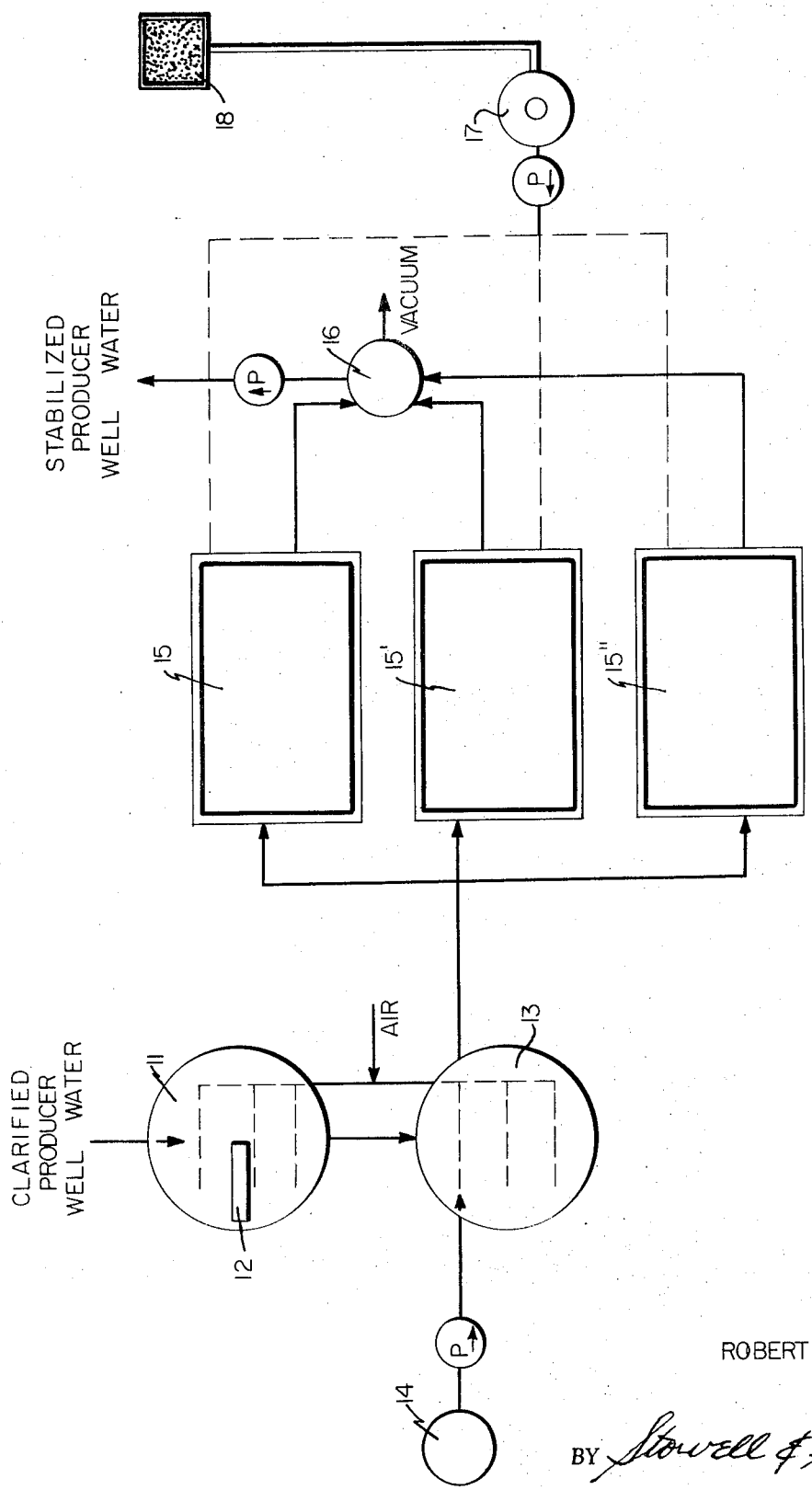

Robert C. Emmett, Jr., Dundee, Ill., assignor to Envirotech Corporation, Salt Lake City, Utah
Filed Jan. 11, 1971, Ser. No. 105,492
Int. Cl. C02b 1/28
U.S. Cl. 210—50                                                7 Claims

ABSTRACT OF THE DISCLOSURE

Producer well water intended for use in the secondary recovery of oil by water flooding is stabilized by aeration, treatment with a coagulant and filtration through a precoated vacuum filter.

---

This invention relates to a method for stabilizing producer well water intended for use in the secondary recovery of oil.

Petroleum or crude oil is obtained from underground pools maintained by what are designated as primary and secondary recovery processes. In primary recovery, oil is brought to the pool by various pressures existent within the oil bearing formation. In secondary recovery, the oil is driven by gas or water pressures of external origin.

Producing oil wells yield crude oil in admixture with varying amounts of water. Producer well water, the name given to the residual aqueous phase after separation of the oil phase, is generally a saline solution or brine, depending on its source, somewhat resembling sea water but having a much higher sulfide ion content and in many cases other soluble metallic salts. Such brines also contain small amounts of suspended oil and finely divided solid matter and generally do not filter well, particularly since further fine-sized solids precipitate during and following filtration.

Water flooding is the name given to the secondary recovery procedure wherein an aqueous flooding medium is injected into an oil bearing formation. The prior art has recognized the desirability of utilizing producer well water, essentially a waste brine, as the water flooding medium for secondary recovery in nearby wells. It is apparent that the flooding medium must be free of suspended oil or solid matter in order to avoid plugging of the porous pathways within the oil bearing formation leading to the well. Producer well water, even when filtered to remove suspended materials, generally continues to postprecipitate further fine-sized solids when used as an aqueous flooding medium due to exposure to air or oxygen.

The invention will be more particularly described with reference to the drawing diagrammatically illustrating apparatus suitable for carrying out the invention.

I have now discovered an improved method for stabilizing producer well water intended for secondary oil recovery by water flooding. The present method yields a solution having a very low residual solids content, a low "negative slope" value and no appreciable tendency to postprecipitate further solids. In addition, producer well water stabilized by the method of the present invention is highly compatible with the aqueous system already present in the oil bearing formation.

More specifically, the present invention is a method for stabilizing producer well water intended for use in the secondary recovery of oil by water flooding which comprises aerating the water for a time sufficient to cause maximal precipitation by oxidation of soluble salts therefrom, e.g., 10–60 minutes, adding to the water a coagulating material sufficient to aid in coalescing the precipitated material, e.g., 10–30 parts per million of alum, and passing the water through a precoated vacuum filter to separate the precipitated material therefrom.

According to the prior art, a primary purpose of the aeration step is to oxidize the unstable sulfides normally found in producer well water to insoluble sulfur. Concomitantly therewith soluble ferrous iron is oxidized to ferric hydroxide and/or other insoluble ferric compounds. It is apparent that the exact time required for complete oxidation depends on the amount of air introduced into the well water, the manner of dispersement and the amount of sulfides, ferrous iron and other air-oxidizable materials present therein. In the most cases, aeration for 10–15 minutes has been found sufficient when conventional type aerating equipment is used. However, superior results are obtained when aeration is continued up to one hour. Further, aeration, while not harmful, is of little or no additional benefit.

The sulfur and hydrated ferric oxides produced by oxidation during aeration are in the form of colloidal-sized particles. Solutions containing such particles are extremely difficult to purify by conventional filtration procedures because the particles clog the fine pores of the filter. In the present method, 10–30 parts per million of an inorganic coagulant type material such as alum (hydrated aluminum sulfate), starches, polymers and the like, is added concurrent with or subsequent to aeration in order to coagulate and/or coalesce the small amount of solids present and/or formed. Even so, filtration by conventional procedures remains tedious.

The overall stabilization method of the present invention is practical only when the filtration step is effected utilizing a precoated pressure differential type filter such as a rotary drum vacuum filter wherein the porous filter medium is coated with filter aids such as diatomaceous earth and expanded perlite to form a precoat bed thereon. The solids present in the brine and the precipitated material resulting from the aeration-flocculation treatment of the brine are retained on or near the surface of the precoat bed; the stabilized brine passes through fairly readily.

The basic filter unit in a rotary drum vacuum filter is a rotating segmented drum with internal piping from each segment connecting to a receiver. The receiver is connected to a vacuum pump which provides a pressure differential, generally 10–24 inches of mercury necessary for fluid flow through the filter bed. The filter medium is submerged in the suspension being filtered about 50–100% of the cycle. (Initial precoating is most uniformly and efficiently effected when the filter surface is fully submerged in the precoating medium.) The separated solids on the filter bed are removed as a heavy sludge air dried by reducing the liquid level in the tank and drawing air through the filter bed during the dewatering portion of the cycle. A continuously advancing doctor blade is utilized to uniformly remove the filtered material, together with a thin layer of the precoat bed during each revolution of the filter drum. In so doing a clean filter surface is presented to the suspension being filtered each cycle.

The clarified and stabilized filtrate is collected and usually stabilized and stored in a hold tank as required. Small amounts of antibacterials, oxygen scavengers such as sodium sulfite, metal precipitation-inhibiting agents such as sodium metaphosphate, and/or other conventional additives may be incorporated into the brine. Polymeric agents may also be added to adjust the viscosity of the brine for use in conjunction with more viscous oils.

My invention is further illustrated by means of the following non-limiting examples:

Well water from an oil-water separator used to separate petroleum from a producing well in the Long Beach, California area, after treatment in an API separator followed by methane flotation, is passed to an air flotation tank. Prior to stabilization by the method of the present invention, the slightly alkaline well water (pH 7.5) contains about 5 p.p.m. of sulfide and 20–300 p.p.m. of suspended oil and solid matter. As air is dispersed into the air flotation tank, a greater portion of the suspended oil is carried to the surface where it is removed by skimming. The solution from the air flotation tank (if air flotation is bypassed the solution direct from the separator) is passed to an aeration-flocculation tank where air is dispersed into the bottom of the tank. A precalculated quantity of a stock alum preparation is added to bring the solution to approximately 20 p.p.m. of alum. After aeration for about 15 minutes, the solution is filtered through a previously precoated rotary drum vacuum filter using the indicated thicknesses of commercially available diatomaceous earths. The cycle varied from 1.27–1.4 minutes per revolution (m.p.r.) and the doctor blades advanced to cut from 0.0008–0.0059 inches per revolution (in./rev.). The flow rate in gallons per hour per square foot (g.p.h./ft.$^2$) and the results obtained during an untreated control and the stabilization treatment of the present invention are summarized below:

|  | Filtration conditions | | | | | Filtrate | |
| --- | --- | --- | --- | --- | --- | --- | --- |
|  | Precoat thickness, in. | Cycle, m.p.r. | Vacuum, in. Hg | Cut, in./rev. | G.p.h./ ft.$^2$ | Neg. slope | Solids, p.p.m. |
| Untreated control | 1.5 | 1.27 | 15 | .002 | 57.5 | 49 | 6.4 |
|  | 0.5 | 1.4 | 16 | .0008 | 67.0 | 1.3 | 18.8 |
| Aerated and alum treated | 1.5 | 1.27 | 15 | .0014 | 60.0 | 0.06 | 0.7 |
|  | 1.5 | 1.27 | 16 | .0021 | 57.4 | 0.01 | 0.5 |

Producer well water stabilized by the method of the present invention has a suspended solids content of 0.5–1.5 parts per million (measured 60 minutes after filtration) and a negative slope of 0.01–0.06. Negative slope is obtained by passing treated well water through a membrane having a 60 mm. diameter and a pore size of 0.45 micron under a head pressure equivalent to a 4 foot column of water. The flow in ml./sec. through the membrane is determined for several times and plotted along the vertical axis of a two-cycle semi-log graph paper while the cumulative volume in ml. is plotted along the horizontal axis. The slope of the resultant curve (which will approach zero as the suspended solids decrease) is determined by dividing the length of the vertical axis by the length of the horizontal axis. It has been found that a negative slope of lower than 0.2 (less negative), and preferably between 0.01 and 0.06, is desired to preclude blockage of the well interstices when the water is reintroduced into the well.

Continuous operation of the method of the present invention is illustrated in the drawing herewith. Clarified producer well water influent from the field is passed to aeration tank 11 and the oil-containing froth brought to the surface is removed by skimmer 12 and may be recycled to the clarifier (not shown). Solution from the lower portion of the first aeration tank is passed to second aeration tank 13 to complete its oxidation. Alum solution from storage tank 14 is continuously fed to the second aeration tank and air is blown into both aeration tanks by means of a blower (not shown). The oxidized solution from the second aeration tank is pumped to precoated rotary drum vacuum filter 15, 15′ and 15″ wherein the solids are separated in the manner described above. Filtrate passes to the common receiver 16 attached to a source of vacuum (not shown) and the stabilized producer well water so produced is pumped to storage.

Prior to filtration, the filter utilized was coated with diatomaceous earth from storage bin 18 made into a slurry with water in mixer 17 and pumped to the filter being coated. As shown, the system contains more than one filter unit so that at least one unit can be in operation while the others are cleaned, precoated and otherwise made ready for use. A particularly desirable rotary drum vacuum filter for use in practicing the method of the present invention is described in commonly assigned U.S. patent application, Ser. No. 843,502, filed July 22, 1969 to Steven S. Davis, the disclosure of which is incorporated herein by reference.

I claim:

1. A method for stabilizing producer well water containing solids and soluble salts of sulfur and iron intended for use in the secondary recovery of oil by water flooding, which comprises the steps of:
   (a) aerating said well water for a time sufficient to convert substantially all of said soluble salts of iron and sulfur present therein into an insoluble material,
   (b) adding to the water a coagulant sufficient to aid in coalescing said insoluble material, and
   (c) passing said water through a filter aid-precoated vacuum filter to separate said solids and said insoluble material therefrom to provide a filtrate having a negative slope of less than 0.2 (approaching zero) to preclude blockage of interstices when the water is reintroduced into the well.

2. A method according to claim 1 wherein the aerating step is for 10–60 minutes.

3. A method according to claim 1 wherein the coagulant is an inorganic salt.

4. A method according to claim 1 wherein the coagulant is alum.

5. A method according to claim 1 wherein the filter is precoated with a filtering aid.

6. A method according to claim 5 wherein the filtering aid is diatomaceous earth.

7. A method according to claim 5 wherein the filtering aid is an expanded perlite.

References Cited
UNITED STATES PATENTS

| | | | |
| --- | --- | --- | --- |
| 3,235,489 | 2/1966 | Bell et al. | 210—75 X |
| 2,468,188 | 4/1949 | Frankenhoff | 210—75 |
| 3,259,571 | 7/1966 | Marshall et al. | 210—75 X |

OTHER REFERENCES

Coogan, G. J., Diatomite Filtration for Removal of Iron and Manganese, Jour. AWWA, vol. 54, December 1962, pp. 1507–1517.

Lindsay, F. K., et al., Removal of Silica from Water by Sodium Aluminate, Ind. & Eng. Chem., vol. 31, July 1939, pp. 859–861.

MICHAEL ROGERS, Primary Examiner

U.S. Cl. X.R.

166—42; 210—75